Figure 1:
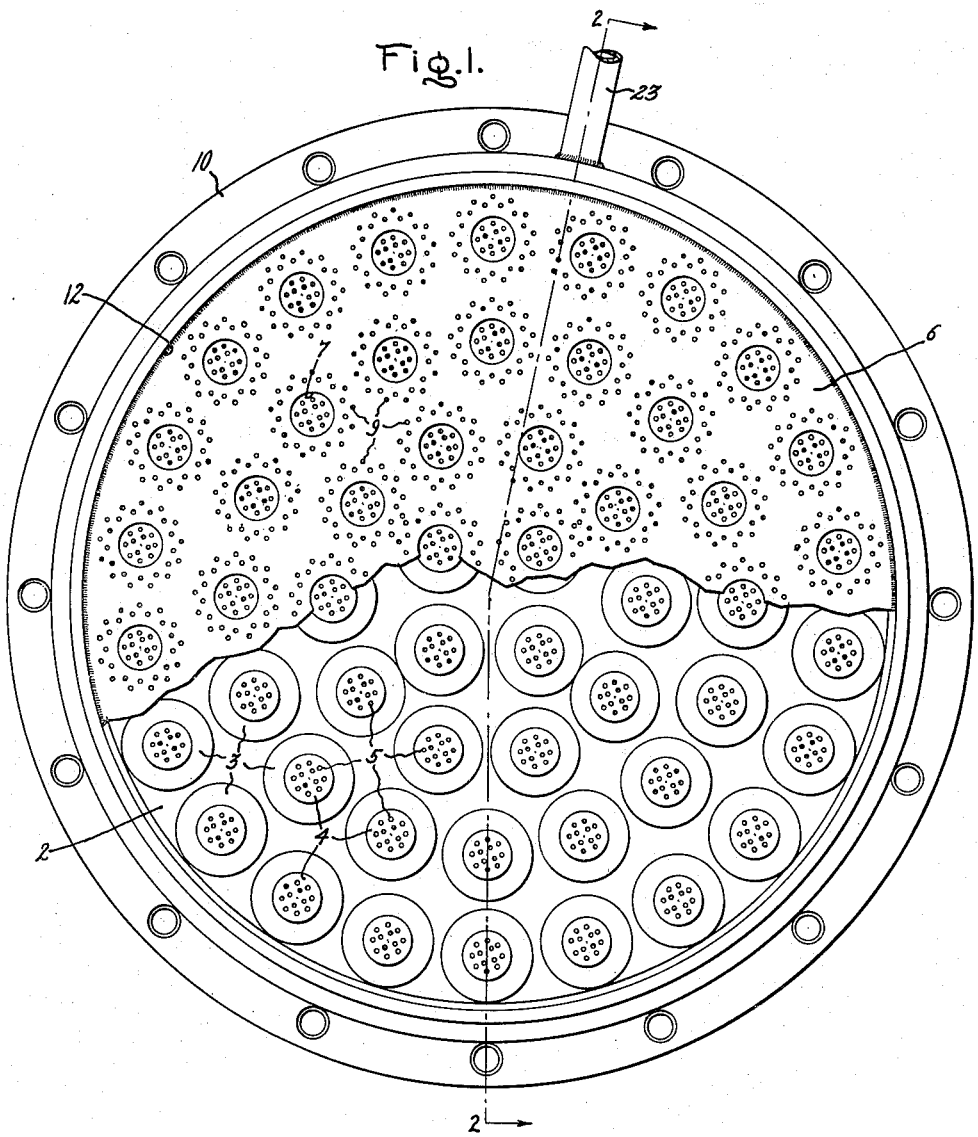

Feb. 7, 1956     G. L. MACPHERSON     2,733,570

INJECTION HEAD FOR JET PROPULSION SYSTEM

Filed May 25, 1951     2 Sheets-Sheet 1

Inventor:
George L. Macpherson,
by   *Claude H. Mott*
His Attorney.

Feb. 7, 1956 G. L. MACPHERSON 2,733,570
INJECTION HEAD FOR JET PROPULSION SYSTEM
Filed May 25, 1951 2 Sheets-Sheet 2
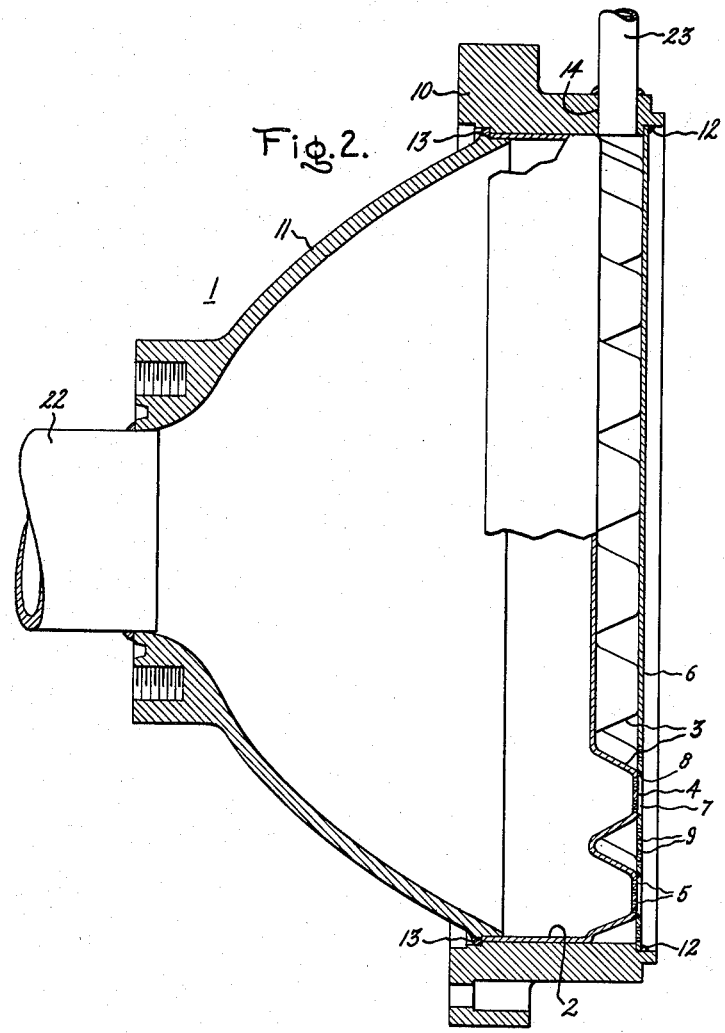
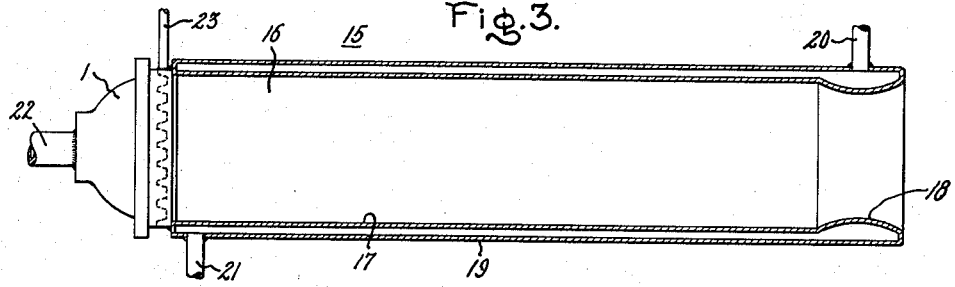
Inventor:
George L. Macpherson,
by  *Clarke F. Mitt*
His Attorney.

United States Patent Office 2,733,570
Patented Feb. 7, 1956

2,733,570

INJECTION HEAD FOR JET PROPULSION SYSTEM

George L. Macpherson, Scotia, N. Y., assignor to General Electric Company, a corporation of New York Application May 25, 1951, Serial No. 228,156

2 Claims. (Cl. 60—39.46)

My invention relates to an injection head. More particularly, it relates to an injection head for a jet propulsion system using liquid reactants.

The term "jet propulsion system" as used herein includes all so-called reaction type engines wherein the mechanical driving thrust or force is derived from the reaction of equal and opposite forces arising between the motor body and the body of the reactants attained during conversion of the reactants or propellants into gaseous products of greater volume than that occupied by the reactants, as distinguished from internal combustion engines of the reciprocating type. Devices falling within this definition and in the operation of which my invention may be employed are commonly known as rockets, ram-jets, turbo-jets, pulse-jets, and turbo-prop-jets.

Injection heads presently utilized to inject fuel or oxidizer or both into the combustion chambers of reaction motors are characterized by a number of disadvantages. Among these disadvantages is their excessive weight. Their excessive weight arises largely from the fact that they are ordinarily machined from massive stock. The weight of the head reduces the amount of fuel, payload carried, and distance traveled by a particular vehicle and detracts from its overall usefulness. Besides leaving a large amount of critical material over and above that required for the requisite strength, the machining process is long and costly.

It is an object of my invention to provide an improved injection head for reaction motors.

Another object of my invention is to provide such an injection head which is relatively light in weight.

A further object of my invention is to provide such an injection head which is easy to fabricate.

Another object of the invention is to provide a jet propulsion system embodying my improved injection head.

Other objects will become apparent from a consideration of the following description and the drawing.

In accordance with my invention, there is provided an injection head of sheet metal in which one of the reactants is fed through holes in raised portions or protrusions in a backplate and the other reactant is ejected through holes in a faceplate fixed to said protrusions.

My invention will be better understood by a consideration of the following description and the drawing in which Fig. 1 is a plan view of the injection head looking upstream; Fig. 2 is a cross-sectional elevational view of the injection head of Fig. 1 taken along the line 2—2 and Fig. 3 is an elevational view partly in cross section, of a jet propulsion engine embodying my new injection head.

As shown more particularly in Fig. 2, the injection head 1 is made largely of thin or sheet metal construction. Backplate 2 is formed of sheet metal which has been pressed to provide a plurality of outwardly extending buttons or truncated, cone-like protrusions or raised portions 3 having in their downstream exposed faces 4 or upper parts a plurality of holes 5. Faceplate 6 is also of sheet metal and has therein a plurality of holes 7 which mate with and closely fit around or about the raised faces 4 of the backplate 3. The flat faceplate is held ragidly and liquid tight to the backplate preferably by means of welds 8 or in other well-known manner. A plurality of ejection holes 9 are provided in faceplate 6 as shown about faces 4 of the backplate for the ejection of a second reactant. The faceplate-backplate assembly is fixed to a mounting flange 10 and reservoir shell or body 11 by welding as at 12 and 13. A plurality of transverse holes 14 in flange 10 serves to admit one of the reactants to the space between faceplate 6 and backplate 2.

Shown in Fig. 3 is a typical installation of my injection head in a rocket motor 15 as exemplary of jet-propelled devices. The rocket motor comprises a combustion chamber 16 having a wall 17 with injection head 1 at the upstream end for the introduction of reactants and a nozzle 18 at the downstream end for the discharge of combustion gases. Preferably, though not necessarily, the combustion chamber wall 17 is surrounded by a cooling jacket 19 having inlet and outlet pipes 20 and 21 for the circulation of a cooling fluid such as water. In lieu of water one of the liquid reactants can be circulated through the cooling jacket prior to ejection from the injection head. The reactants are introduced into the injection head from suitable storage facilities not shown through pipes 22 and 23. In operation, the reactants are fed through conduits 22 and 23, injected into the combustion chamber, burned and the gas produced ejected from nozzle 18 producing a thrust directed upstream of the nozzle.

The ejection head operation is as follows. Liquid oxidizer is introduced into the injection head through conduit 22 and fills reservoir 11, exiting into the combustion chamber through the plurality of holes 5 in the face 4 of each backplate protrusion 3. The fuel reactant such as alcohol, gasoline, etc., is introduced into the injection head through conduit 23, fills the space between the faceplate 6 and backplate 2 and exits into the combustion chamber through holes 9. Alternatively, the oxidizer and fuel feeds can be interchanged, though the operation as described above is preferred.

Holes 5 and 9 may be of any size or shape desired and disposed in oxidizers, such as liquid oxygen, either directly downstream or canted as desired to provide for any prearranged impingement of liquid streams one upon the other.

The relatively large space behind the backplate and the downstream-conveying character of the cone-like projections, as well as the short ejection holes, obviates the formation of bubbles behind the ejection holes. These bubbles are a major contributing factor to uneven flow of reactant and instability of the usual reaction motor.

The injection head of my invention is also characterized by ability to withstand high pressures despite its lightness and ease of manufacture. For example, a head having a faceplate about eight and five-eighths inches in diameter with the faceplate made of one-eighth inch stainless steel and backplate made of one-sixteenth inch stainless steel operates satisfactory at combustion chamber pressures of about 350 pounds per square inch. For operation at substantially higher pressures reinforcing ribs are fixed at the rear of the backplate.

Whereas stainless steel is preferred, any suitable metal can be used in the construction of the injection head of my invention. For example, to vary the heat conduction properties of the faceplate, stainless steel-faced metals of other types, such as copper, may be utilized.

While I have described only one particular embodiment of my invention, it is my intention to cover all modifications which do not depart from the spirit and scope of the invention.

What I claim as new and desire to secure by Letters Patent of the United States is:

1. A reactant injection head for a jet propulsion system, said injection head having inlet and outlet means for oxidizer and fuel reactants, said outlet means comprising a sheet metal member having a plurality of truncated, hollow, cone-like protrusions each terminating in a face, a flat sheet metal faceplate having holes therein mating with the faces of said protrusions and fixed thereto, said faces having perforations, and the faceplate also having perforations surrounding said faces for the issue of reactant.

2. A jet propulsion system comprising a combustion chamber, an outlet in said chamber for the issue of hot gases, and reactant injection means, said injection means comprising a hollow body portion having inlet means for a first reactant, the outlet means for said reactant comprising a sheet metal backplate member fixed to said hollow body portion having hollow, outwardly-extending protrusions terminating in faces, each face having perforations therein for the issue of said first reactant, a flat sheet metal faceplate member fixed to the protrusions of said backplate member and having holes therein mating with the faces of said backplate member, inlet means for a second reactant leading into the space between said faceplate member and the protrusions of said backplate member, said faceplate member also having perforations therein arranged about said protrusions for the issue of said second reactant.

References Cited in the file of this patent

UNITED STATES PATENTS

| | | |
|---|---|---|
| 685,230 | Speirs | Oct. 22, 1901 |
| 753,023 | White | Feb. 23, 1904 |
| 993,687 | Jackson | May 30, 1911 |
| 1,444,263 | Mustee | Feb. 6, 1923 |
| 2,532,709 | Goddard | Dec. 5, 1950 |